(12) United States Patent
Ishikawa et al.

(10) Patent No.: US 7,272,279 B2
(45) Date of Patent: Sep. 18, 2007

(54) WAVEGUIDE TYPE OPTICAL BRANCHING DEVICE

(75) Inventors: Hiroshi Ishikawa, Hitachi (JP); Tomoyuki Hakuta, Hitachinaka (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/580,832

(22) Filed: Oct. 16, 2006

(65) Prior Publication Data
US 2007/0086704 A1   Apr. 19, 2007

(30) Foreign Application Priority Data
Oct. 18, 2005   (JP) ............................. 2005-302688

(51) Int. Cl.
*G02B 6/42* (2006.01)
(52) U.S. Cl. .............................. 385/43; 385/39; 385/45
(58) Field of Classification Search .................. 385/14, 385/16, 21, 31, 39–40, 43–45, 129–132
See application file for complete search history.

(56) References Cited

U.S. PATENT DOCUMENTS

| | | | |
|---|---|---|---|
| 5,528,708 A * | 6/1996 | Van Der Tol ................. | 385/14 |
| 5,991,475 A * | 11/1999 | Nelson ......................... | 385/16 |
| 6,094,516 A * | 7/2000 | Nolting et al. ................ | 385/40 |
| 2004/0151423 A1 * | 8/2004 | Izhaky et al. ................. | 385/21 |

FOREIGN PATENT DOCUMENTS

JP   3225819 B2   8/2001

OTHER PUBLICATIONS

Y. Shani et al., "Integrated Optic Adiabatic Devices on Silicon," IEEE Journal of Quantum Electronics, vol. 27, No. 3, Mar. 1991, pp. 556-566.
M. Izutsu et al., "Optical-waveguide hybrid coupler," Optics Letters, vol. 7, No. 11, Nov. 1982, pp. 549-551.

* cited by examiner

*Primary Examiner*—Quyen P Leung
(74) *Attorney, Agent, or Firm*—Foley & Lardner LLP

(57) ABSTRACT

A waveguide type optical branching device having: two input ports; two output ports; optical waveguides extending from the input ports and the output ports respectively; and a coupling portion formed allowing the optical waveguides from the input ports and the output ports to gradually approach each other in a direction toward the output ports. The device is operable such that, in a direction from the input ports to an output end of the coupling portion, when light is inputted to one input port of the two input ports, an even more is predominantly excited, and when light is inputted to the other input port of the two input ports, an odd mode is predominantly excited. The optical waveguides in the coupling portion have a core width that is larger at a middle position in a height direction thereof than at an upper surface of the core.

7 Claims, 6 Drawing Sheets

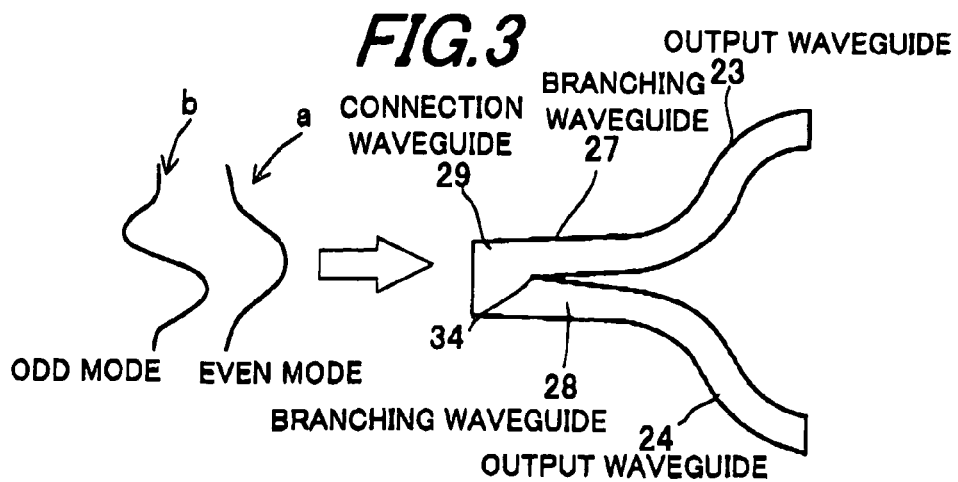
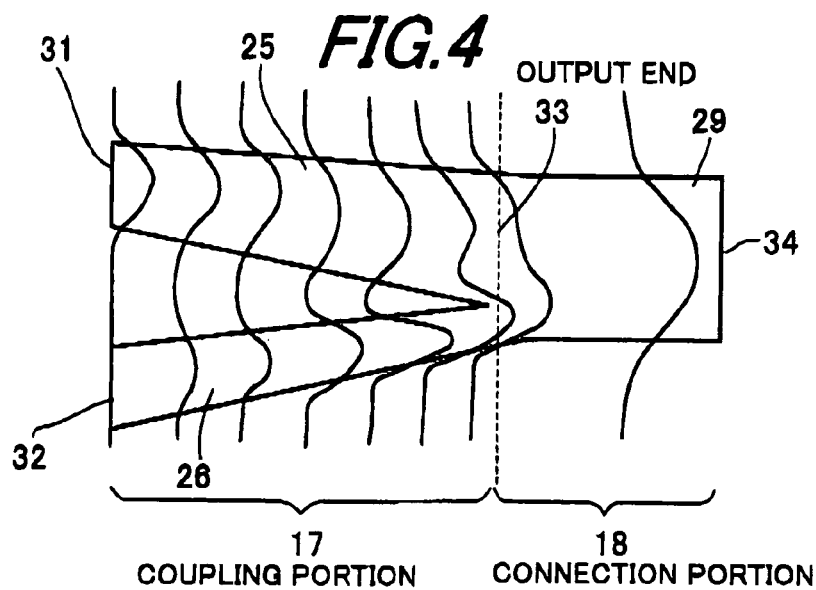
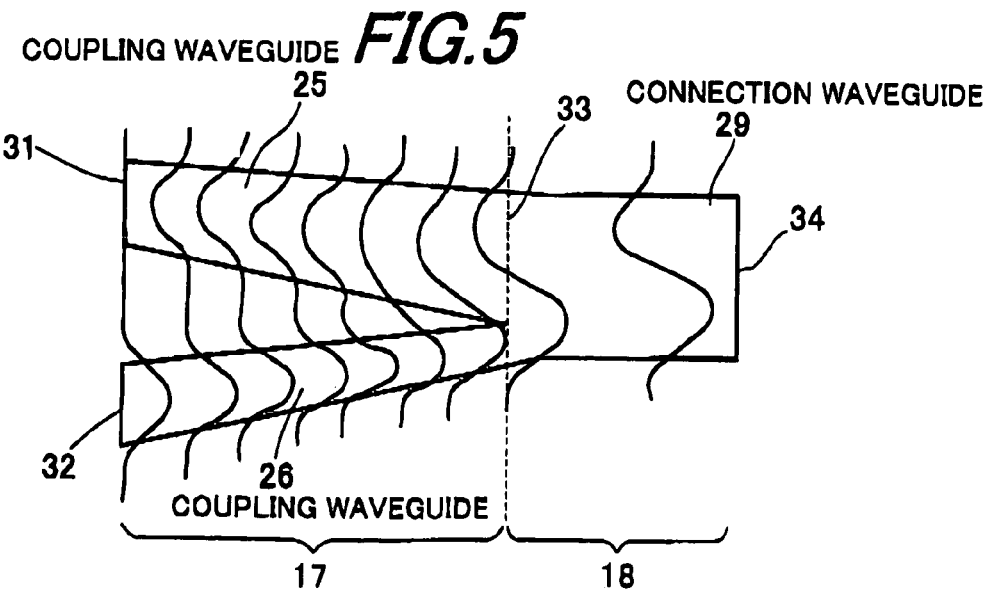

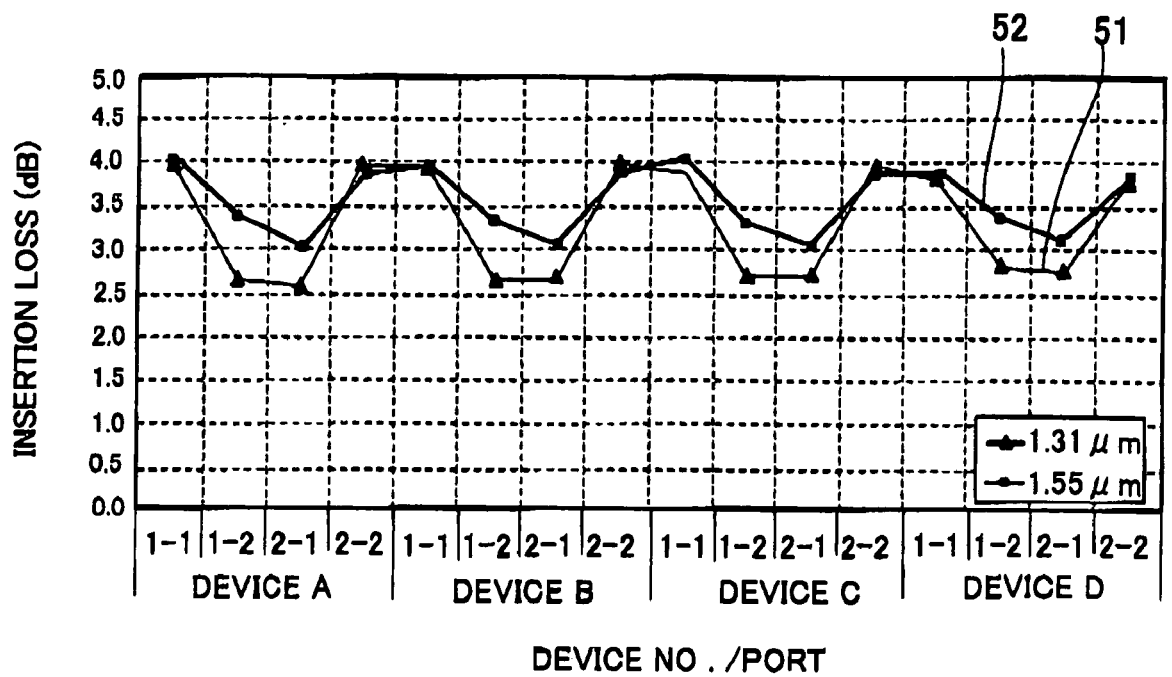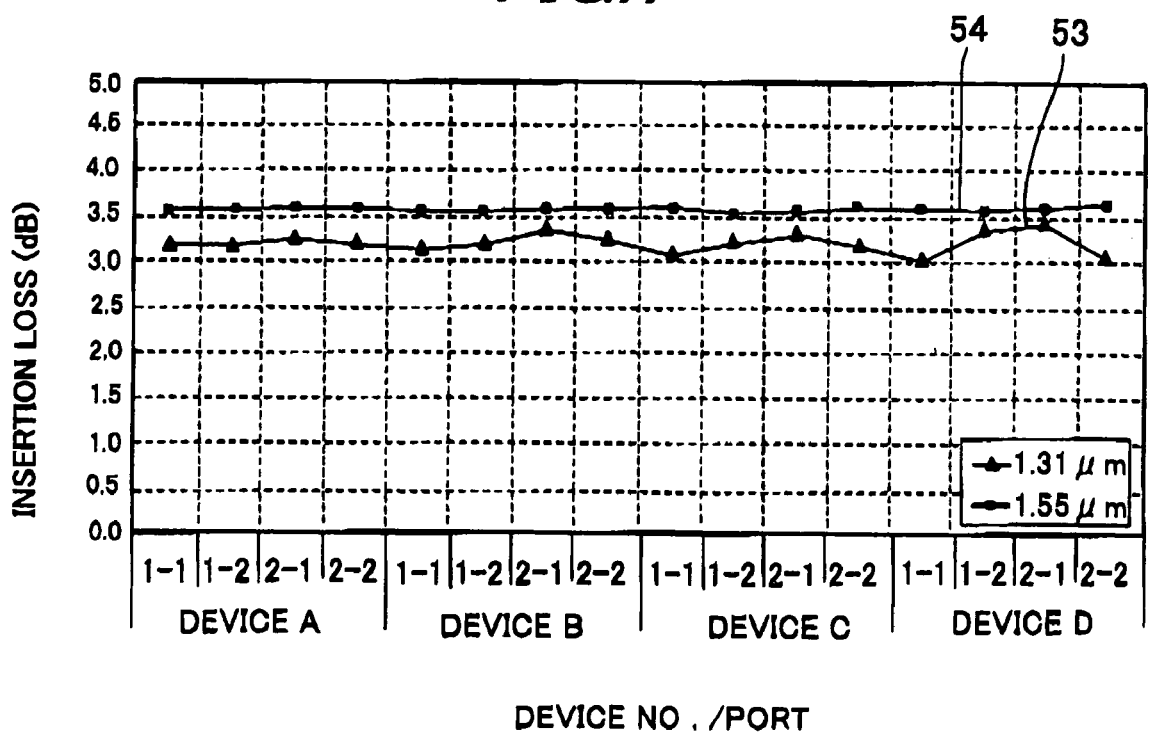

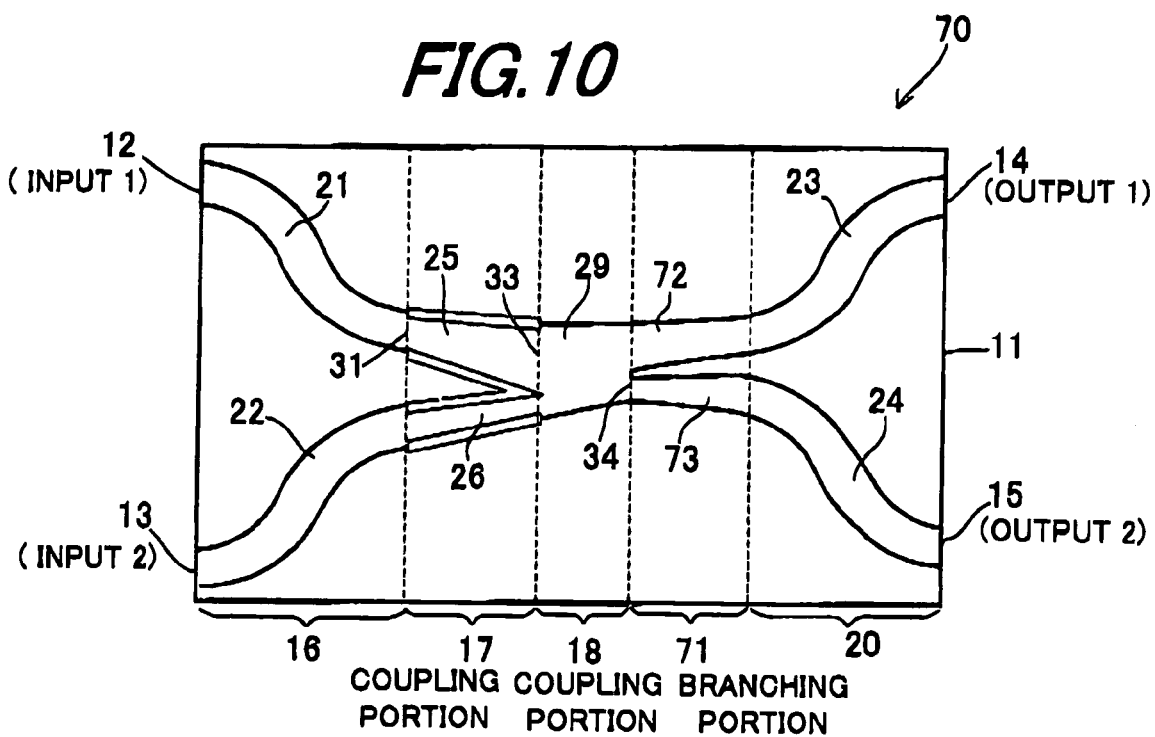
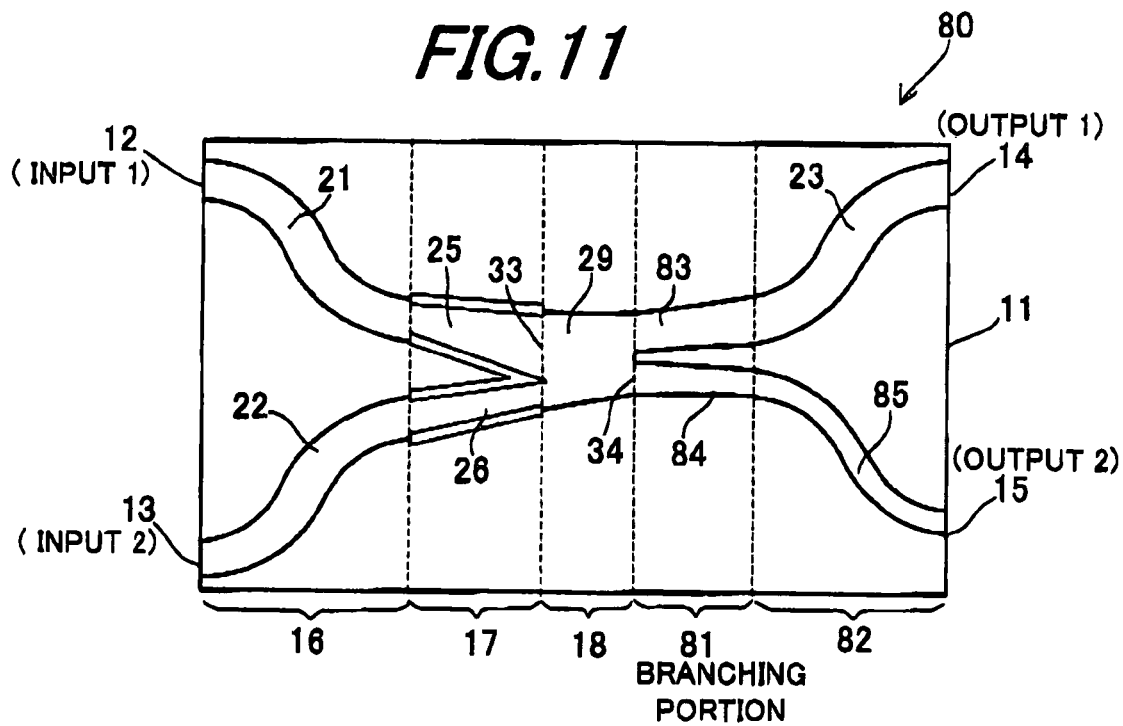

WAVEGUIDE TYPE OPTICAL BRANCHING DEVICE

The present application is based on Japanese patent application No. 2005-302688 filed Oct. 18, 2005, the entire contents of which are incorporated herein by reference.

BACKGROUND OF THE INVENTION

1. Field of the Invention

This invention relates to a waveguide type optical branching device and, particularly, to a waveguide type optical branching device with an X-branching optical circuit for branching light at a specified branching ratio.

2. Description of the Related Art

Optical communication system access networks have as their indispensable constituent element an optical branching device (a 2×N coupler) for causing 1.25-1.65 μm wavelength incident light from two input-side optical fibers to branch into plural output-side optical fibers at a constant branching ratio regardless of wavelengths, polarizations, and input ports.

The 2×N coupler typically comprises a 2-input and 2-output optical branching device (a 2×2 coupler) with a constant branching ratio, and two 1-input and M-output optical branching devices (a 1×M coupler, M=N/2) respectively connected to the output ports of the 2×2 coupler.

Because the optical properties of the 2×2 coupler are generally poor in comparison to the optical properties of the 1×M coupler, the optical properties of the 2×N coupler are restricted mainly by the optical properties of the 2×2 coupler. Accordingly, in order to realize a high-performance and low-cost 2×N coupler, it is important to realize a 2×2 coupler with a constant branching ratio regardless of wavelengths, polarizations, and input ports.

Because the 2×2 coupler is one of the most basic constituent elements of the waveguide type optical branching device, if a 2×2 coupler is realized with a constant branching ratio regardless of the conditions such as wavelengths, etc., it is also very useful in applying it to optical communication components other than access networks, or optical waveguide components used in fields other than optical communications As techniques for realizing a 2×2 coupler whose branching ratio does not depend on wavelengths, polarizations, and input ports, there are known a fusion coupler using a fused and drawn optical fiber, a Mach-Zehnder interferometer-waveguide type wavelength-independent coupler (MZI-WINC), a waveguide type optical branching device (a waveguide type coupler) using an asymmetrical X-branching optical circuit, and a waveguide type optical branching device using an adiabatic coupler type optical circuit.

As shown in FIG. 12, a waveguide type optical branching device 90 using an adiabatic coupler type optical circuit comprises two input ports 91a and 91b; two output ports 92a and 92b; and optical waveguides 93 and 94 for connecting the input ports 91a and 91b and the output ports 92a and 92b, respectively. The two optical waveguides 93 and 94 gradually approach each other to form a coupling portion 95 comprising the two parallel optical waveguides 93 and 94 close to each other. As shown in FIG. 13, the two optical waveguides 93 and 94 comprise a core 97 formed on a substrate 96 and with a rectangular cross section in the light propagation direction, and cladding 98 that covers the core 97. The G in the figure denotes the length of a gap between two cores 97 in the coupling portion 95.

A light signal input from one input port 91a of the waveguide type optical branching device 90 is mode-converted to be caused to branch at the optical power ratio of substantially 1 to 1 and output from the two output ports 92a and 92b (See JP-B-3225819, and Y. Shani et al., "Integrated Optic Adiabatic Devices on Silicon", IEEE, J. Lightwave Technol., 1991, vol. 27, p.p. 556-566).

As shown in FIG. 14, a waveguide type optical branching device 100 using an asymmetrical X-branching optical circuit comprises, on a substrate not shown, two input ports 101a and 101b; two output ports 102a and 102b; and a coupling portion 107 for coupling, in an X shape, optical waveguides 103, 104, 105 and 106 from the input ports 101a and 101b and the output ports 102a and 102b respectively. The two optical waveguides 103 and 104 on the input port 101a and 101b side have the same core width, while the two optical waveguides 105 and 106 on the input port 102a and 102b side are formed so that one optical waveguide 105 has a large core width and the other optical waveguide 106 has a small core width.

In the waveguide type optical branching device 100 of FIG. 14, a light signal input from one input port 101a is caused to branch at the ratio of substantially 1 to 1 in the coupling portion 107 and output from the two output ports 102a and 102b (See M. Izutsu, A. Enokihara, T. Sueta, "Optical-waveguide hybrid coupler", OPTICS LETTERS, 1982, Vol. 7, No. 11, p.p. 549-551).

However, there is the problem that the 2×2 coupler using the fusion coupler, or MZI-WINC tends to cause fabrication errors in the optical branching device to be fabricated, resulting from its fabrication method and optical circuit design principle, so that the branching ratio tends to vary according to input wavelengths and input ports.

For this reason, there arises the problem that the 2×2 coupler using the fusion coupler, or MZI-WINC has difficulty in holding the branching ratio constant for all use wavelengths and all input ports.

This 2×2 coupler also has difficulty in stable and low-cost fabrication because optical characteristics are easily varied by fabrication errors.

Further, there is the problem that although in the conventional waveguide type optical branching device using an asymmetrical X-branching optical circuit, or the optical branching device using an adiabatic coupler type optical circuit, asymmetrical branching ratios of e.g., 1:4 or more are verified to be effective, a waveguide type optical branching device with the branching ratio of 1:1 fabricated under actual fabrication conditions causes significant variations in the branching ratio dependent on input wavelengths and input ports, which cannot satisfy required performance of optical communication systems.

For that reason, in the waveguide type optical branching device 90 explained in FIGS. 12 and 13, in order to make the branching ratio constant regardless of input wavelengths and input ports, it is necessary to lengthen the coupling portion 95 (coupling length), or strengthen optical coupling in the coupling portion 95.

In the asymmetrical X-branching optical circuit and adiabatic coupler type optical circuit, according to an adiabatic theorem that describes wave propagation in a system in which core cross-sectional shape or structure varies in the light propagation direction, by lengthening the coupling length sufficiently, the branching ratio of the above optical circuit can be constant, but in practice, it is difficult to make the length of the optical circuit more than a certain value because of constraints in fabrication apparatus and fabrication cost. Also, in order to form the long coupling length, increasing the size of the waveguide type optical branching device is not desirable.

To realize an asymmetrical X-branching optical circuit with a constant branching ratio without lengthening the coupling portion 95, although it is necessary to narrow a gap G in the coupling portion 95 and thereby strengthen optical coupling between the two optical waveguides, because of the micron-sized gap G in the coupling portion 95, and therefore constraints in light exposure and etching techniques in conventional fabrication methods, it is difficult to make the gap G in the coupling portion 95 less than a constant value.

For the above reason, the conventional fabrication methods have difficulty in realizing an asymmetrical optical circuit with a constant branching ratio without increasing practical optical circuit size.

SUMMARY OF THE INVENTION

Accordingly, it is an object of the present invention to provide a waveguide type optical branching device with 2×2 inputs and outputs, capable of obviating the above problems, and having a constant branching ratio regardless of wavelengths, polarizations, and input ports.

(1) According to one aspect of the invention, a waveguide type optical branching device comprises:
two input ports;
two-output ports;
optical waveguides extending from the input ports and the output ports respectively; and
a coupling portion formed allowing the optical waveguides from the input ports and the output ports to gradually approach each other in a direction toward the output ports,
wherein the waveguide type optical branching device is operable such that, in a direction from the input ports to an output end of the coupling portion, when light is inputted to one input port of the two input ports, an even more is predominantly excited, and when light is inputted to the other input port of the two input ports, an odd mode is predominantly excited, and
the optical waveguides in the coupling portion comprise a core width that is larger at a middle position in a height direction thereof than at an upper surface of the core.

(2) According to another aspect of the invention, a waveguide type optical branching device comprises:
two input ports;
two output ports;
input waveguides formed connected to the two input ports respectively;
coupling waveguides formed connected to the input waveguides respectively while allowing the input waveguides to gradually approach each other in a direction toward the output ports;
output waveguides formed connected to the two output ports respectively;
branching waveguides formed connected to the output waveguides respectively while allowing the output waveguides to gradually separate each other in the direction toward the output ports; and
a connection waveguide through which the coupling waveguides and the branching waveguides are connected,
wherein the waveguide type optical branching device is operable such that, in a direction from the input ports to an output end of the coupling waveguides, when light is inputted to one input port of the two input ports, an even mode is predominantly excited, and when light is inputted to the other input port of the two input ports, an odd mode is predominantly excited; and
the coupling waveguides comprise a core width that is larger at a middle position in a height direction thereof than at an upper surface of the core.

In the inventions (1) and (2), the following modifications and changes can be made.

(i) The coupling waveguides comprise a core width varied asymmetrically, and a spacing therebetween decreased gradually in a direction toward the output ports.

(ii) The waveguide type optical branching device comprises a branching ratio of 4:1 to 1:4 in a direction from the input ports to the output ports.

(iii) The core comprises a quartz or an impurity-doped quartz.

<Advantages of the Invention>

The present invention exhibits the excellent effect of being able to cause input light to branch at a constant branching ratio regardless of wavelengths, polarizations, and input ports.

BRIEF DESCRIPTION OF THE DRAWINGS

The preferred embodiments according to the invention will be explained below referring to the drawings, wherein:

FIG. 3 is an explanatory diagram showing the principle of optical coupling in a coupling portion;

FIG. 4 is an explanatory diagram showing an optical specific electric field distribution in a coupling portion during optical input into one coupling optical waveguide;

FIG. 5 is an explanatory diagram showing an optical specific electric field distribution in a coupling portion during optical input into the other coupling optical waveguide;

FIG. 6 is a diagram showing relationships between input and output ports and transmission loss in a conventional waveguide type optical branching device;

FIG. 7 is a diagram showing relationships between input and output ports and transmission loss in a waveguide type optical branching device of FIG. 1;

FIG. 10 is a plan view showing a second preferred embodiment of a waveguide type optical branching device according to the present invention;

FIG. 11 is a plan view showing a third preferred embodiment of a waveguide type optical branching device according to the present invention;

DETAILED DESCRIPTION OF THE PREFERRED EMBODIMENTS

Figure 1:
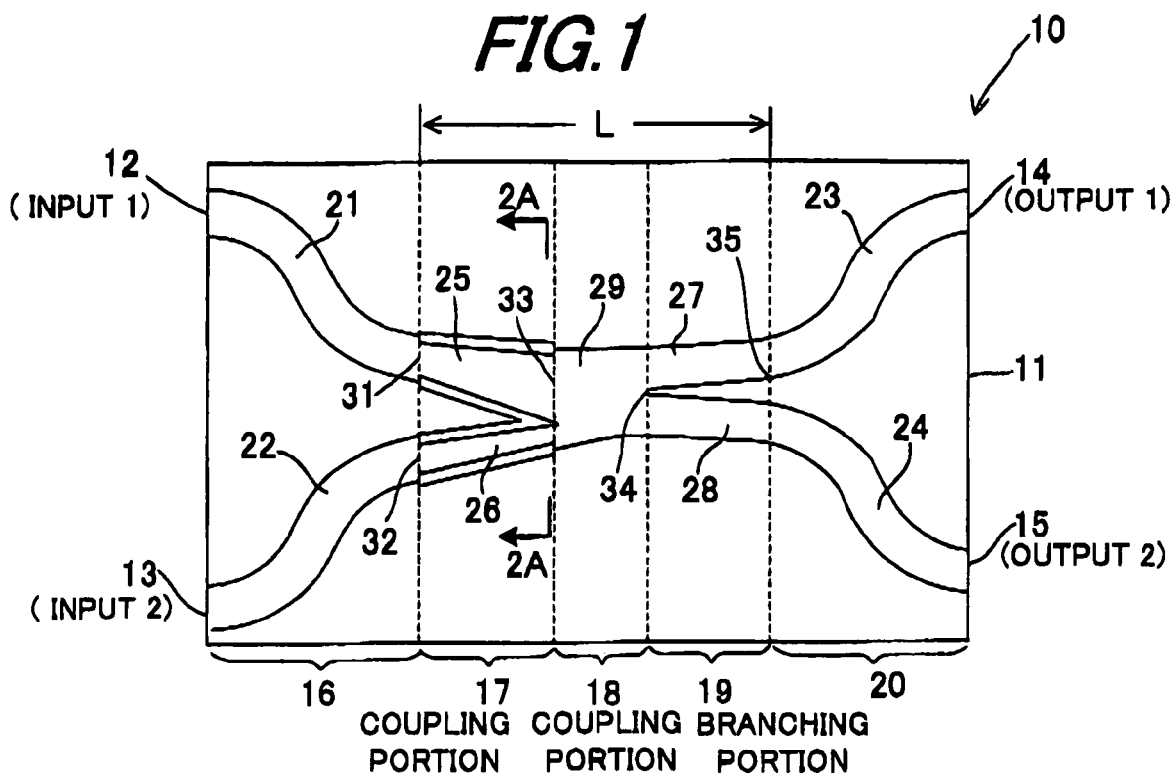
FIG. 1 is a plan view showing a first preferred embodiment of a waveguide type optical branching device according to the present invention.

FIG. 1 is a plan view showing a first preferred embodiment of a waveguide type optical branching device according to the present invention.

As shown in FIG. 1, a waveguide type optical branching device 10 includes an optical waveguide comprising, on a substrate 11, a core and cladding that covers the core. The waveguide type optical branching device 10 has two input ports 12 and 13 and two output ports 14 and 15, formed in substrate 11 end faces, respectively, opposite each other. The input ports 12 and 13 and the output ports 14 and 15 are respectively used for light inputting from and outputting to outside.

Connected to the two input ports 12 and 13 are input waveguides 21 and 22 respectively. Connected to the two output ports 14 and 15 are output waveguides 23 and 24 respectively. Connected to the two input waveguides 21 and 22 are coupling waveguides 25 and 26 respectively that gradually approach each other. Connected to the two output waveguides 23 and 24 are branching waveguides 27 and 28 respectively that gradually approach each other. The coupling waveguides 25 and 26 and the branching waveguides 27 and 28 are connected to each other via one connection waveguide 29.

Figure 2:
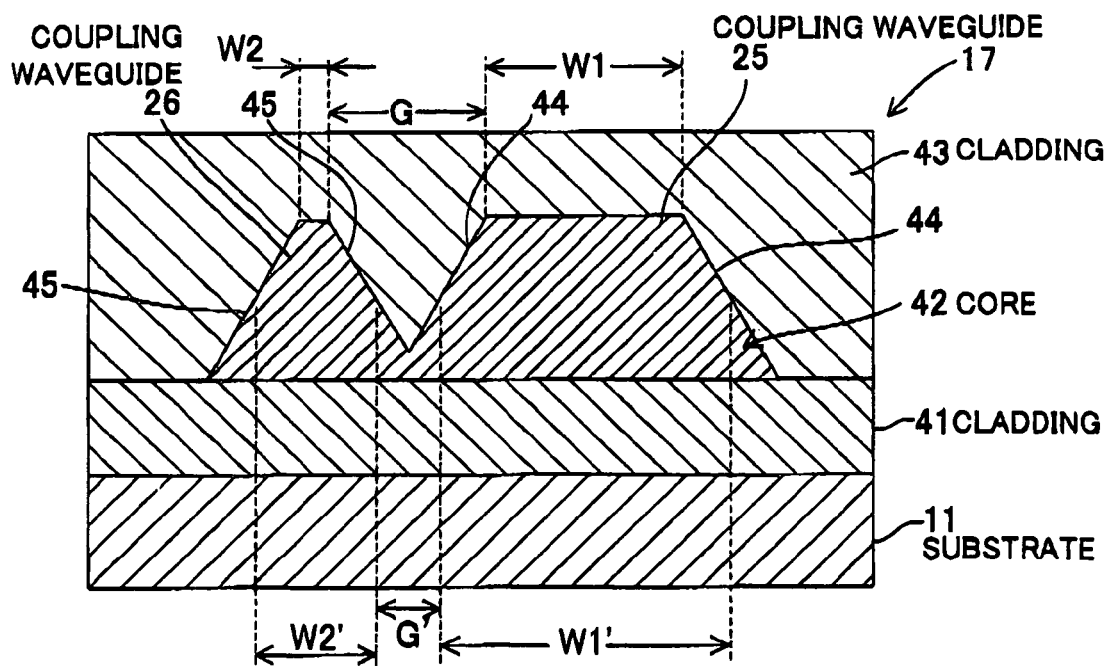
FIG. 2 is a cross-sectional view along line 2A-2A of FIG. 1.

As shown in FIG. 2, in this embodiment, the substrate 11 is formed of quartz or Si. Formed in the upper surface of the substrate 11 is a lower cladding layer 41 comprising pure or impurity-doped quartz. Formed in the upper surface of the lower cladding layer 41 is a core 42 comprising pure or impurity-doped quartz. Deposited thereover is an upper cladding layer 43 comprising pure or impurity-doped quartz to cover the lower cladding layer 41 and the core 42. The relative refractive index difference $\Delta$ between the cladding layers and the core is 0.3-0.4%, and the thickness of the core 42 is 7.0-8.0 μm.

Where the substrate 11 is formed of quartz, it is not necessary to provide the lower cladding layer 41.

Returning to FIG. 1, in the waveguide type optical branching device 10, the two input waveguides 21 and 22 serve as an input-side pitch conversion portion 16; the coupling waveguides 25 and 26 that approach each other serve as a coupling portion 17; the connection waveguide 29 serve as a connection portion 18; the branching waveguides 27 and 28 that approach each other serve as a branching portion 19; and the two output waveguides 23 and 24 serve as an output-side pitch conversion portion 20.

In the input-side pitch conversion portion 16, the input waveguides 21 and 22 are bent to cause the two input waveguides 21 and 22 to approach each other immediately before optical coupling occurs, and thereby serve to prevent the coupling portion 17 from being extended more than necessary.

The coupling portion 17 is the most essential in realizing the waveguide type optical branching device 10. Its two waveguides are formed parallel to have micro-spacing therebetween, and the optical coupling strength between the coupling waveguides 25 and 26 is weak, so that light that propagates through the coupling portion 17 has two supermodes.

Specifically, as the coupling portion 17, one coupling waveguide 25 (upper in the figure) is formed to gradually increase its core width towards an output end 33, while the other coupling waveguide 26 (lower in the figure) is formed to gradually decrease its core width towards the output end 33, and the distance between both the coupling waveguides 25 and 26 to also gradually decrease towards the output end 33.

The coupling portion 17 serves to control amplitude and phase distributions of the electric field component of light, so that the light input from one input end 31 excites only a substantially even symmetrical super-mode (an even mode) at the output end 33 of the coupling portion 17, while the light input from the other input end 32 excites only a substantially odd symmetrical super-mode (an odd mode) at the output end 33 of the coupling portion 17.

For this reason, the coupling portion 17 has structure that satisfies the following two conditions:
(A) The two coupling waveguides 25 and 26 have different core widths W1 and W2 at the output end 33.
(B) The distance between the two coupling waveguides 25 and 26 gradually decreases from the input ends 31 and 32 to the output end 33.

The connection portion 18 has one connection waveguide 29 that connects the output end 33 of the coupling portion 17 and an input end 34 of the branching portion 19. The connection waveguide 29 serves to adjust relative phases of unwanted electric field components other than the supermodes that have occurred in the coupling portion 17, and thereby reduce the dependency of the branching ratio on the input port.

The connection waveguide 29 is designed so as not to change, as much as possible, the optical electric field distribution in a waveguide cross section perpendicular to the propagation direction from the output end 33 of the coupling portion 17 to the input end 34 of the branching portion 19. The connection portion 18 may be entirely omitted, to directly connect the output end 33 of the coupling portion 17 and the input end 34 of the branching portion 19.

The branching portion 19 and the output-side pitch conversion portion 20 serve to distribute power of the even symmetrical super-mode (the even mode) and the odd symmetrical super-mode (the odd mode) that have passed through the input end 34 of the branching portion 19, to the output ports 14 and 15 spaced apart with a specified distance, at a constant branching ratio, to output to outside. In the branching portion 19, the two branching waveguides 27 and 28 are formed in a symmetrical Y-branch shape to have the branching ratio of 1:1, but may be formed in another shape that has an asymmetrical Y-branch, a sinusoidal curved pattern with two tapers, a tapered pattern, a circular arc pattern with an offset, or a linear pattern with two tapers.

Here, a mechanism of optical coupling in the coupling portion 17 will be explained.

As shown in FIG. 3, realizing an asymmetrical X-branching circuit with a constant branching ratio regardless of wavelengths, polarizations, and input ports requires matching the electric field distribution of input light into the output waveguides 23 and 24, to a basic (0-order) mode (a in the figure) and a high order (1-order) mode (b in the figure) at the input end 34 of the branching waveguides 27 and 28, regardless of wavelengths, polarizations, and input ports.

The shape, equivalent refractive index of the two coupling waveguides 25 and 26 are determined in the following way: As shown in FIG. 4, light input from the coupling waveguide 25 in the coupling portion 17 whose core has a large diameter is coupled to the coupling waveguide 26 with a core whose diameter gradually becomes small, so that the electric field distribution at the output end 33 of the coupling portion 17 is matched to the basic mode (a in FIG. 3) at the input end 34 of the branching waveguides 27 and 28. As shown in FIG. 5, light input from the coupling waveguide 26 in the coupling portion 17 whose core has a small diameter is coupled to the coupling waveguide 25 with a core whose diameter gradually becomes large, so that the electric field distribution at the output end 33 of the coupling portion 17 is matched to the high order mode (b in FIG. 3) at the input end 34 of the branching waveguides 27 and 28.

The structure of the coupling waveguides 25 and 26 is not limited to the shape shown in FIG. 1, but may be such that the light input from the input port 12 excites only a substantially even symmetrical super-mode (an even mode) at the output end 33 of the coupling portion 17, while the light input from the input port 13 excites only a substantially odd symmetrical super-mode (an odd mode) at the output end 33 of the coupling portion 17.

It is assumed that plural optical circuit patterns of the coupling portion 17 can satisfy simultaneously the above-mentioned two conditions (A) and (B). However, it is generally known from experience that the above-mentioned conditions (A) and (B) cannot be satisfied unless the coupling waveguide length (a region where the two coupling waveguides 25 and 26 are close to each other to allow optical power interaction) is sufficiently long, or unless the distance (gap) between the two coupling waveguides 25 and 26 is sufficiently small, regardless of optical circuit pattern shapes.

In consideration of this, as shown in FIG. 2, the waveguide type optical branching device 10 of this embodiment is characterized in that the gap G' of the middle portion of the waveguide core is smaller than the gap G of the upper surface of the core, specifically, the widths W1' and W2' of the middle portion in the height direction of the core are larger than the widths W1 and W2 of the upper surface in the height direction of the core.

In the coupling portion 17 of this waveguide type optical branching device 10, the two coupling waveguides 25 and 26 have inclined surfaces 44 and 45 on the core side, so that they respectively have the widths W1' and W2' in the middle portion of the core larger than the widths W1 and W2 of the upper surface of the core. This forms the gap G' between the core middle portions narrower than the gap G of the core upper surface.

In the coupling portion 17, the two coupling waveguides 25 and 26 are formed in a linearly-tapered shape in which the core width is linearly varied in the light propagation direction, or in a curvedly-tapered shape in which the core width is curvedly varied in the light propagation direction. The core width at the output end 33 is such that the core width W1 of the upper surface of one coupling waveguide 25 is 7.0-9.0 µm, while the core width W2 of the upper surface of the other coupling waveguide 26 is 2.0-3.0 µm. The length of the connection portion 18 is 1 µm. The branching waveguides 27 and 28 of the branching portion 19 have the same core width to have the branching ratio of 1:1. The length L from the input ends 31 and 32 of the coupling portion 17 to the output end 35 of the branching portion 19 is 8-10 µm.

Although the waveguide type optical branching device 10 is made by forming an optical circuit pattern with photolithography and etching, the sidewalls 44 and 45 of the core are inclined so that the gap G' between the core middle portions can thereby be smaller than the gap G of the core upper surface determined by a light exposure accuracy limit. Accordingly, a waveguide type optical branching device can be formed that can realize a narrow gap, i.e., strong optical coupling using a conventional fabrication method, thereby allowing the branching property of an asymmetrical X-branching optical circuit.

Here, shown in FIG. 6 is the transmission loss of a waveguide type optical branching device (G=G') whose coupling waveguides 25 and 26 have vertical core sidewalls, and whose other optical circuit pattern is formed in the same way as that of the waveguide type optical branching device 10 of FIG. 1, while shown in FIG. 7 is the transmission loss of the waveguide type optical branching device 10 of the embodiment of FIG. 1 (G>G') whose coupling waveguides 25 and 26 have inclined core sidewalls 44 and 45. In FIGS. 6 and 7, the vertical axis represents the transmission loss, and the horizontal axis device No. A-No. D and input/output port No. For example, shown in FIG. 6 are results of measuring transmission losses by modifying the combination of the input/output ports and measurement wavelength for the 4 waveguide type optical branching devices A-D fabricated in the same shape and same conditions. The port numbers respectively represent inputs-outputs. For example, the 1-1 represents the transmission loss of light input from input 1 and output from output 1 (see FIG. 1). The characteristic lines 51 and 53 represent the case where the input wavelength is 1.31 µm, and the characteristic lines 52 and 54 represent the case where the input wavelength is 1.55 µm.

As shown in FIG. 6, the waveguide type optical branching devices whose coupling waveguides 25 and 26 have vertical core sidewalls have variations of the order of 1.5 dB in the transmission loss due to input wavelengths and input ports, whereas as shown in FIG. 7, the waveguide type optical branching devices 10 of the embodiment whose coupling waveguides 25 and 26 have inclined core sidewalls 44 and 45 can inhibit variations below 0.5 dB in the transmission loss due to input wavelengths and input ports, so that practically adequate characteristics can be obtained.

The characteristic results of the waveguide type optical branching devices shown FIGS. 6 and 7 show that because of use of the same fabrication conditions other than the angles of the sidewalls of the coupling waveguides 25 and 26, by inclining the sidewalls of the core, an asymmetrical X-branching optical circuit can be realized with a constant branching ratio regardless of wavelengths and input ports.

Figure 8:
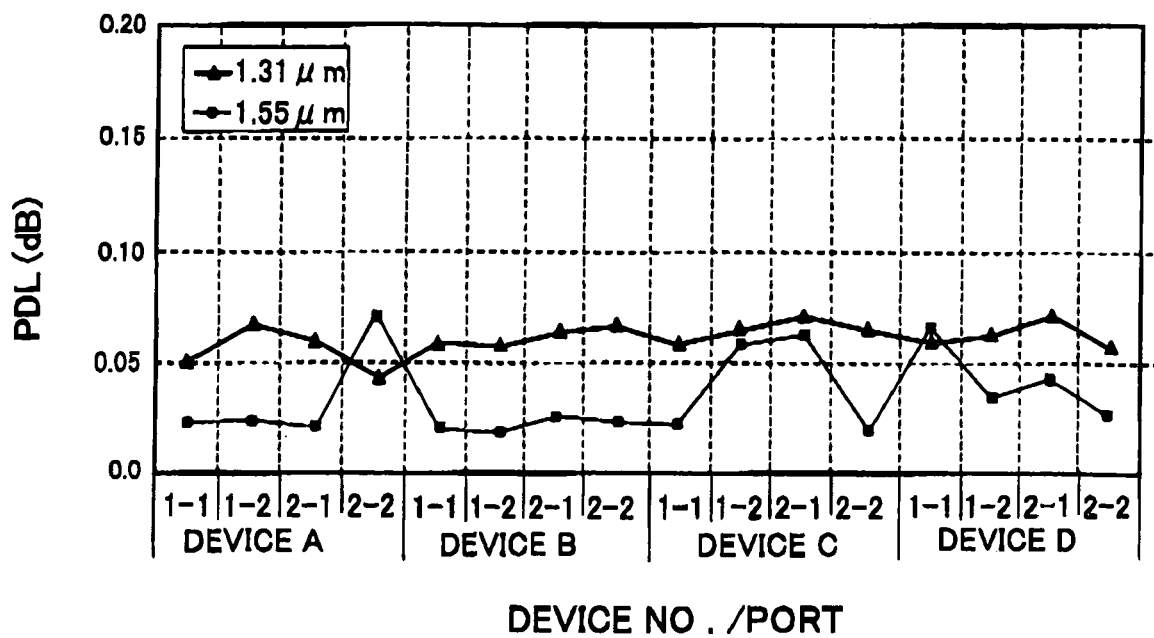
FIG. 8 is a diagram showing the dependency of transmission loss on optical polarization in a waveguide type optical branching device of FIG. 1.

As shown in FIG. 8, in the polarization dependent loss (PDL) of the waveguide type optical branching device of this embodiment, variations due to wavelengths and input ports are inhibited below 0.5 dB, and the dependency of the transmission loss on polarization can also be reduced.

Figure 9:
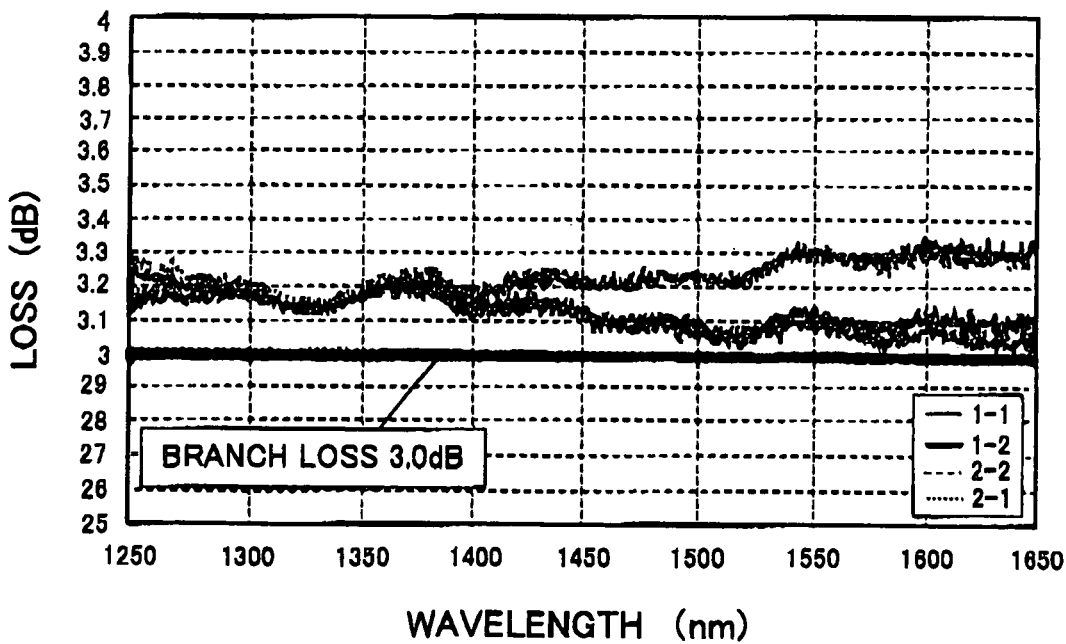
FIG. 9 is a diagram showing the dependency of transmission loss on wavelength in a waveguide type optical branching device of FIG. 1.
Figure 12:
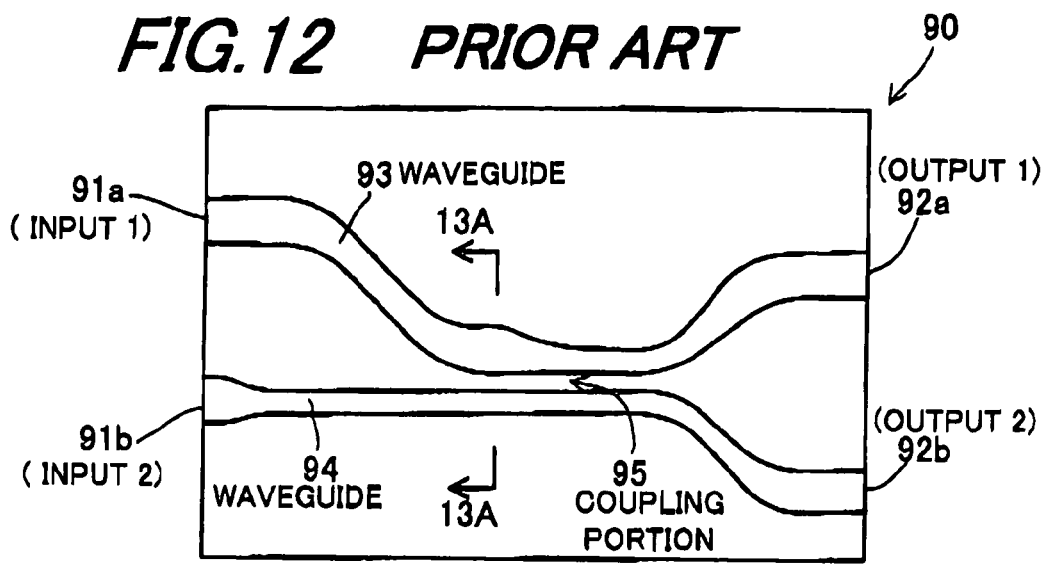
FIG. 12 is a plan view showing a conventional waveguide type optical branching device with an adiabatic coupler type optical circuit.
Figure 13:
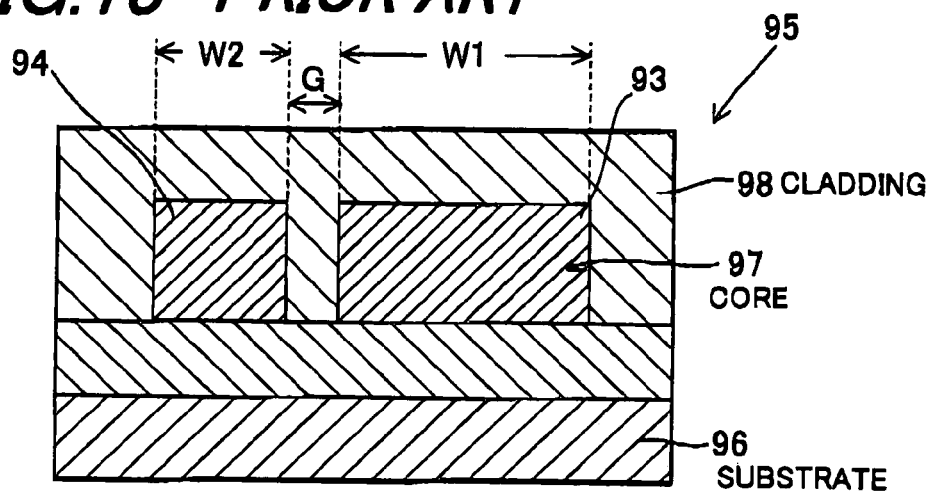
FIG. 13 is a cross-sectional view along line 13A-13A of FIG. 12.
Figure 14:
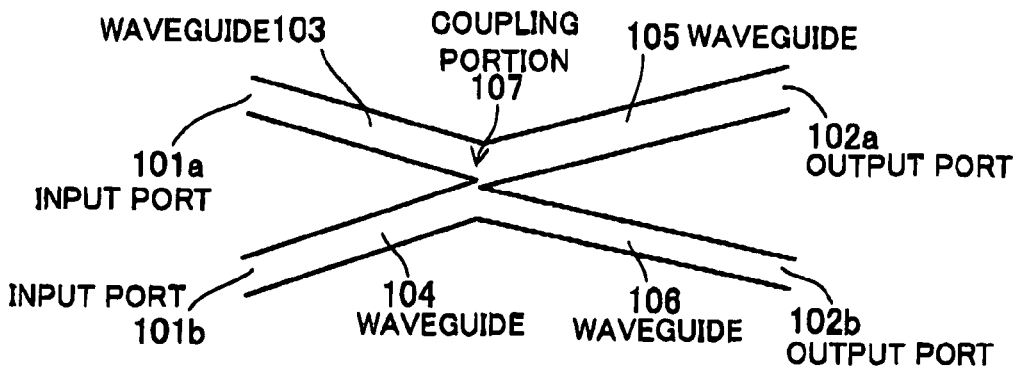
FIG. 14 is a plan view showing a conventional waveguide type optical branching device with an X-branching optical circuit.

As shown in FIG. 9, variations in the transmission loss at wavelengths of 1.25-1.65 µm are below 0.3 dB, so that there is little dependency of the transmission loss on wavelengths.

In this manner, by choosing the shape of the sidewalls of the coupling waveguides 25 and 26 to be G-G'>0, the effective gap can be small, to be able to improve the branching ratio property of the asymmetrical X-branch, to realize an ideal 2×2 coupler with little variations in the branching ratio due to wavelengths, polarizations, and input ports.

Although in this embodiment, only the core sidewalls 44 and 45 of the coupling waveguides 25 and 26 have been formed in the inclined surfaces, core side surfaces of all the optical waveguides on the substrate (input waveguides 21 and 22, output waveguides 23 and 24, branching waveguides 27 and 28, connection waveguide 29) may be formed in the inclined surfaces. Forming the core of all the optical waveguides in the inclined surfaces has the merit of reducing the number of fabrication steps such as light exposure, etching, etc.

Although in this embodiment, the waveguide type optical branching device has the output-side branching ratio of 1:1, it is possible to easily realize a 2×2 coupler with a branching ratio of the order of 1:4-4:1.

Next, a second preferred embodiment of the present invention will be explained by reference to FIG. 10.

Because basic constituent portions are substantially the same as those of the waveguide type optical branching device 10 of FIG. 1, the same constituent portions are denoted by the same characters as in FIG. 1, the difference is that a branching portion 71 has two asymmetrical branching waveguides with a branching ratio other than 1:1.

As shown in FIG. 10, in a waveguide type optical branching device 70 of this embodiment, at the input end 34 of the branching portion 71, the width of one branching waveguide 72 (on the upper side in the figure) is formed to be larger than the width of the other branching waveguide 73 (on the upper side in the figure). The branching waveguide 72 is formed to gradually decrease its core width towards the output waveguide 23, while the branching waveguide 73 is formed to gradually increase its core width towards the output waveguide 24. The branching waveguides 72 and 73 have the same core width as that of the output waveguides 23 and 24 respectively so as to be connected thereto.

As shown in FIG. 11, a waveguide type optical branching device 80 of a third preferred embodiment is different in branching portion 81 and output-side pitch conversion portion 82 from the waveguide type optical branching device 10 of FIG. 1. In this waveguide type optical branching device 80, both branching waveguides 83 and 84 have the same core width at the input end 34 of the branching portion 81, and one branching waveguide 83 (on the upper side in the figure) is formed to have a constant core width towards the output waveguide 23, while the other branching waveguide 84 is formed to gradually decrease its core width towards the output waveguide 85, and the output waveguide 85 connected to the branching waveguide 84 is also formed to gradually decrease its core width towards the other output waveguide 23.

In the waveguide type optical branching devices 70 and 80 of the second and third embodiments, the waveguides of the branching portions 71 and 81 are significantly arbitrary in shape (core width at input and output ends, taper shape, circuit shape), so that a numerical calculation method such as a beam propagation method is used to appropriately select parameters such as shape, length, relative refractive index difference, etc. and form the waveguides of the branching portions 71 and 81 to thereby be able to cause light to branch at a desired branching ratio.

The waveguide type optical branching devices 70 and 80 shown in FIGS. 10 and 11 respectively also have the core middle widths larger than the core upper surface widths in the coupling portion 17, as in the waveguide type optical branching device 10 of FIG. 1, to thereby be able to increase optical coupling strength and improve the branching property of the asymmetrical X-branching optical circuit.

The effective scope of the present invention is not constrained to the above parameter range. The method of the present invention, which inclines the sidewalls of the core to improve the branching property of the asymmetrical X-branching optical circuit, may be applied to various waveguide materials, relative refractive index differences, core film thicknesses, optical circuit patterns in the coupling portion and in the branching portion.

The waveguide type optical branching devices 10, 70 and 80 of the first-third embodiments may be used as branching devices inside an interferometer. A branching circuit, which has small dependency on wavelengths, polarizations, and input ports, is required for inputs and outputs of an interferometer of each kind, such as Mach-Zehnder, Michelson, Giles Tourmore. For this reason, the waveguide type optical branching device 10 of this embodiment is useful for broadening the band of operating wavelength of the interferometer.

Particularly, using the waveguide type optical branching devices 10 in the Mach-Zehnder interferometer is useful for broadening the band of a wavelength splitter, a VOA (a variable optical attenuator), a 1×2 optical switch, and a 2×2 optical switch, compared to the prior art.

The waveguide type optical branching devices 10, 70 and 80 may be used as branching devices for optical intensity monitors. They are also useful as broadband optical intensity monitors, such as a power monitor for Raman amplification systems, measurement, fabrication, etc. because of broad operating wavelength bands and small characteristic variations due to fabrication errors.

The waveguide type optical branching devices 10, 70 and 80 may further be applied to a device, which requires broadband X-branching, such as a device for visible light, which requires treating wavelengths in the wide range over 400-700 nm, or a nonlinear optical device, which requires plural wavelength light, such as difference-frequency mixing, second high harmonic generation, four lightwave mixing, parametric amplification, or parametric oscillation.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A waveguide type optical branching device, comprising:
   two input ports;
   two output ports;
   optical waveguides extending from the input ports and the output ports respectively; and
   a coupling portion formed allowing the optical waveguides from the input ports and the output ports to gradually approach each other in a direction toward the output ports,
   wherein the waveguide type optical branching device is operable such that, in a direction from the input ports to an output end of the coupling portion, when light is inputted to one input port of the two input ports, an even more is predominantly excited, and when light is inputted to the other input port of the two input ports, an odd mode is predominantly excited, and
   the optical waveguides in the coupling portion comprise a core width that is larger at a middle position in a height direction thereof than at an upper surface of the core.

2. A waveguide type optical branching device, comprising:
   two input ports;
   two output ports;
   input waveguides formed connected to the two input ports respectively;
   coupling waveguides formed connected to the input waveguides respectively while allowing the input waveguides to gradually approach each other in a direction toward the output ports;
   output waveguides formed connected to the two output ports respectively;

branching waveguides formed connected to the output waveguides respectively while allowing the output waveguides to gradually separate each other in the direction toward the output ports; and a connection waveguide through which the coupling waveguides and the branching waveguides are connected, wherein the waveguide type optical branching device is operable such that, in a direction from the input ports to an output end of the coupling waveguides, when light is inputted to one input port of the two input ports, an even mode is predominantly excited, and when light is inputted to the other input port of the two input ports, an odd mode is predominantly excited; and the coupling waveguides comprise a core width that is larger at a middle position in a height direction thereof than at an upper surface of the core.

3. The waveguide type optical branching device according to claim 2, wherein:

the coupling waveguides comprise a core width varied asymmetrically, and a spacing therebetween decreased gradually in a direction toward the output ports.

4. The waveguide type optical branching device according to claim 2, wherein:

the waveguide type optical branching device comprises a branching ratio of 4:1 to 1:4 in a direction from the input ports to the output ports.

5. The waveguide type optical branching device according to claim 3, wherein:

the waveguide type optical branching device comprises a branching ratio of 4:1 to 1:4 in a direction from the input ports to the output ports.

6. The waveguide type optical branching device according to claim 1, wherein:

the core comprises a quartz or an impurity-doped quartz.

7. The waveguide type optical branching device according to claim 2, wherein:

the core comprises a quartz or an impurity-doped quartz.

* * * * *